Jan. 17, 1939.   C. R. HARTE, JR   2,143,877
GAS LIQUID CONTACT APPARATUS SUCH AS DISTILLATION APPARATUS
Filed April 23, 1936
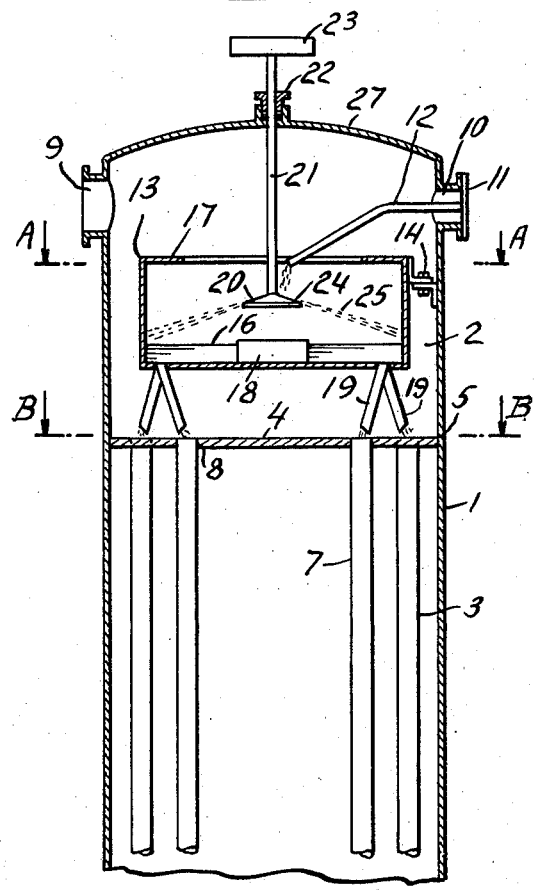
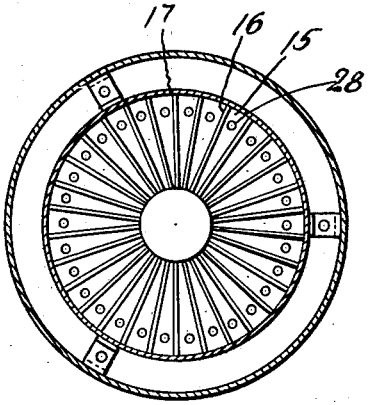
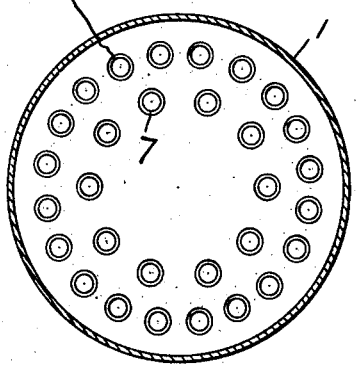
INVENTOR
Charles R Harte Jr.
BY
ATTORNEY Patented Jan. 17, 1939

2,143,877

UNITED STATES PATENT OFFICE 2,143,877

GAS LIQUID CONTACT APPARATUS SUCH AS DISTILLATION APPARATUS

Charles R. Harte, Jr., Niagara Falls, N. Y., assignor to National Aniline and Chemical Company, Inc., New York, N. Y., a corporation of New York Application April 23, 1936, Serial No. 75,933

6 Claims. (Cl. 261—110)

This invention relates to the distribution of liquids in a gas-liquid contact apparatus, and it is particularly concerned with the distribution of reflux condensate continuously and in predetermined proportions to the tubes of a multiple tube distillation column.

In distillation processes using a multiple tube column still, it is of advantage to most efficient operation to return reflux condensate to the tubes of the still continuously and in uniform predetermined amounts to each tube throughout the period of distillation. It is also desirable to effect such distribution within the column structure, and without interference between discharged vapors and the liquid being distributed.

An object of this invention is to provide an improved means for effecting uniform condensate distribution in uniform predetermined portions to the tubes of a multiple column still. It is a further object to provide distribution means within the still column, so arranged that vapors discharged from the tubes of the column will not interfere with the liquid distribution.

Advantages in this invention will be apparent from a description of the accompanying drawing, showing one embodiment of the invention.

In the drawing, Fig. 1 is a cross-sectional elevation of a multiple tube column still incorporating a preferred modification of the invention;

Fig. 2 is a cross-section of the apparatus taken on the line A—A of Fig. 1;

Fig. 3 is a cross-section taken on the line B—B of Fig. 1.

Reference numeral I indicates the shell of a multiple tube distillation column which is divided into a head portion 2, and a tube portion 3, by means of the tube sheet 4, which is circumferentially attached or formed integral with the interior surface of the shell of the column in any suitable manner. The vertical tubes 7 of the still may be arranged as shown in Fig. 3 and terminate at their upper or vapor discharge ends in the tube sheet 4, being affixed thereto in any suitable manner. A vapor discharge opening 9 is provided, preferably in the upper portion of the shell I of the still, and a second opening 10 provides means through which reflux condensate may be admitted to the head portion 2 of the column. Opening 10 is preferably closed by a plate member 11 supporting a tube 12 through which reflux condensate may be conveyed to the container inside the head portion 2, as will be hereinafter described.

Suspended within the interior of the head portion 2 is a cylindrical container 13 of smaller diameter and spaced from the column head. This container may be attached to the shell I of the column in any suitable manner, as shown at 14, and is positioned so that the base thereof is a substantial distance above the tube sheet 4, and the openings of the tubes 7. The upper edge of the container 13 is preferably provided with an inwardly extending flange 17 adapted to prevent liquid from splashing therefrom. The floor of the container 13, as more clearly indicated in Fig. 2, is divided into a plurality of sectorial compartments 15, by means of uniformly spaced upwardly-extending radial baffles 16 which are affixed at one end thereof to the inner surface of container 13, and at the other end are supported by means of a cylindrical ring member 18. The compartments 15 are provided with openings 28 in the base thereof which communicate with pipe members 19 adapted to convey the liquid contained within the compartments to suitable tubes of the still. Since the amount of reflux condensate normally required for each tube is relatively small, pipe members 19 may be of much smaller diameter than the tubes which they supply. The particular arrangement of these pipes may be varied to suit any tube arrangement within the column.

Suspended within the container, preferably directly above the central ring 18, and substantially below the upper opening of the container, is disc member 20 adapted to be rotated at high speed. Motion may be imparted to disc member 20 by means of an axle member 21, journaled in a bearing member 22, positioned in the upper surface 27 of the head portion 2. Axle member 21 may be attached to a prime mover in any suitable fashion, as for example by means of pulley 23, to which may be affixed a belt, not shown, communicating with the source of motive power. The upper surface 24 of the revolving disc member 20 is suitably shaped, for example, it may be flat or in the form of an upright or hollow inverted cone. In operation, the particles of liquid discharged therefrom will impinge against the inner cylindrical surface of the container 13 at points above the upper edges of the baffle members 16.

In operation of the apparatus, reflux condensate is admitted to the column by means of one or more pipes like pipe 12, and allowed to flow continuously upon the upper surface of revolving disc 20, the centrifugal force exerted by the rotating disc causing discharge of the liquid in the form of a substantially continuous liquid sheet or a curtain of spray as indicated by reference numeral 25. The discharged condensate strikes the inner cylindrical surface of the container 13, and is evenly distributed thereover. It then flows downwardly, and the edges of the baffle members 16 effect a subdivision of the liquid into a plurality of equal portions, each of which collects in an appropriate sectorial compartment formed between adjacent baffle members. The liquid thus collected passes through openings 28 in the base of the compartments, and flows through pipes 19 directly into the appropriate column tubes. Vapors which are discharged from the tubes during distillation pass freely out of the still through the space between the shell of the column head and the container 13, without interference with the downward flow of condensate, or in any way disturbing the uniformity of the liquid distribution.

It will be understood that the invention is not limited to the details of construction described above, and modifications therein may be made without departing from the scope of the invention. It may, for example, be desirable to effect a subdivision of the liquid into other than equal portions as shown in the described modification, in which case the baffle members 16 would be disposed to provide compartments or sectors of different sizes in accordance with the desired division of reflux liquid. The invention is particularly applicable to a multiple tube distillation column comprising a nest of vertically disposed tubes which, for example, are arranged at the circumference of a plurality of different circles, as shown in Fig. 3, and as distinguished from an arrangement of the tubes at the circumference of one circle only. Where the tubes are arranged at the circumference of a plurality of different circles it becomes difficult, if not impossible, to secure uniform distribution of liquid to the individual tubes simply by flowing the liquid onto the tube sheet. In accordance with the present invention uniform distribution of liquid to the individual tubes is obtained irrespective of the number or arrangement of the tubes.

I claim:

1. In a column still having a plurality of passages therein for flow of vapors and reflux liquid therethrough, in combination, means for feeding reflux liquid to the separate passages, said means comprising a rotating member for receiving the reflux liquid and separating means for dividing the reflux liquid discharged by said rotating member into a plurality of streams, each of which communicates with one of said passages, said separating means and rotating member being disposed so that the reflux liquid flowing from said rotating member to the separating means does not contact with vapors in the column still.

2. In a fractionating column, in combination, a plurality of vertically disposed tubes through which vapors and reflux liquid pass, said tubes being disposed in said column with the discharge outlets for the vapors disposed in the head of the column at a point beneath the top thereof, a rotating disc in the head of said column above the vapor discharge outlets of said tubes arranged to receive reflux liquid, a distributing member provided with a plurality of compartments, each communicating with a vapor discharge outlet of a tube, the compartments of said distributing member being arranged to receive the reflux liquid discharged by said rotating member, thereby separating the same into a plurality of streams each individual to a tube, said distributing member being located in said head so as to effect the separation of the reflux liquid out of contact with the vapors flowing through said head.

3. A column still provided with a plurality of vertical passageways discharging vapor into the head of said still, distributing means in said head for sub-dividing reflux liquid into separate portions, said distributing means comprising a rotating disc for receiving the reflux liquid and a container in which the rotating disc is disposed, the base of said container being divided into a plurality of compartments, each communicating with one of said passageways and each adapted to discharge reflux liquid received from said rotating disc to the communicating passageway, said container being disposed above the vapor discharge outlets of said passageways.

4. A column still having a plurality of vertically disposed tubes adapted to discharge vapors into a head, said tubes being arranged at the circumference of a plurality of different circles, enclosed distributing means within said head spaced above said vertical tubes, said distributing means comprising a sprayer for incoming liquid, means for collecting a plurality of separate portions of sprayed liquid, and members for separately conducting said liquid portions from said collecting means downwardly into said vertical tubes.

5. A column still having a plurality of vertical passages adapted to discharge streams of vapor into a head, means within said head for uniformly subdividing reflux liquid into a plurality of separate portions each of which is received in a separate open compartment, means to drain freely the liquid in each compartment to an individual vertical passage, and means to shield said liquid during subdivision and while in said open compartments from said streams of vapor.

6. A gas-liquid contact apparatus having a plurality of vertical passages adapted to discharge streams of gas into a head, a plurality of separate open compartments within said head, means to distribute incoming liquid uniformly among said compartments, means to drain freely the liquid in each compartment to an individual vertical passage, and means to shield said liquid during distribution among said compartments and while in said compartments from said streams of gas.

CHARLES R. HARTE, Jr.